May 22, 1956 P. SCHLUMBOHM 2,747,071
ELECTRIC RESISTANCE HEATER
Filed June 24, 1954

INVENTOR.

United States Patent Office 2,747,071
Patented May 22, 1956

2,747,071

ELECTRIC RESISTANCE HEATER

Peter Schlumbohm, New York, N. Y.

Application June 24, 1954, Serial No. 439,054

2 Claims. (Cl. 219—19)

The invention refers to an electric resistance heater, more specifically the invention refers to an immersion heater to heat water in a tea kettle, and the invention is especially characterized by combining the electric immersion heater with a lid for the tea pot. The invention is illustrated by way of example in Figure 1 to Figure 5 of the accompanying drawings.

Figure 1:
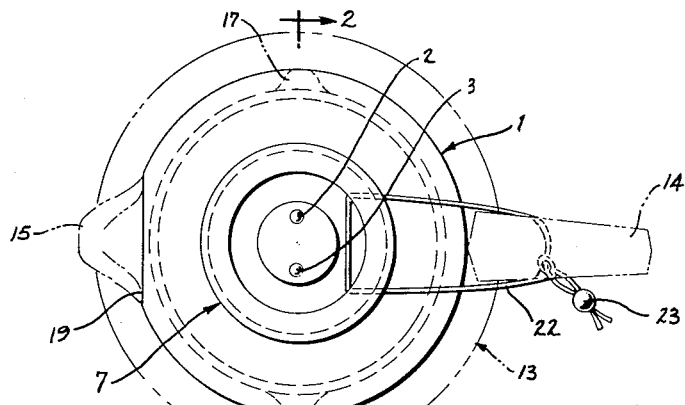
Figure 1 is a top view of a tea kettle and its lid equipped with the heater.
Figure 2:
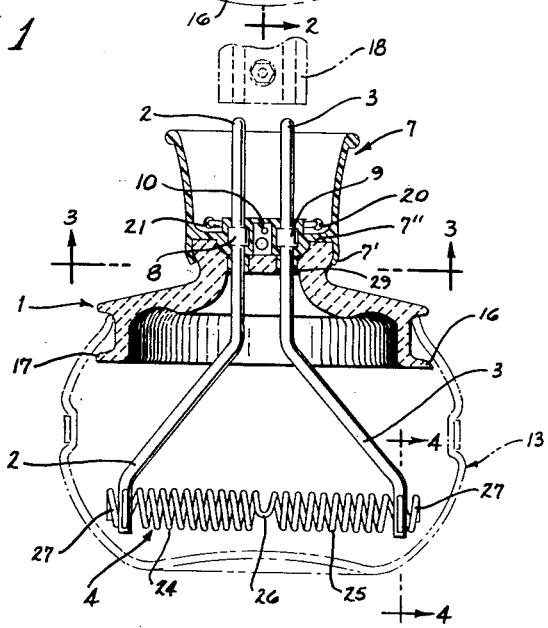
Figure 2 is a vertical section along lines 2—2 of Figure 1.
Figure 3:
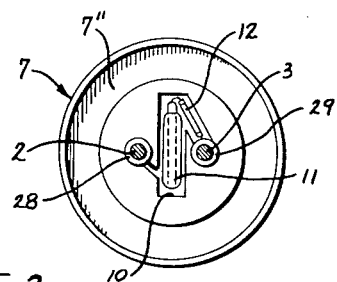
Figure 3 is a bottom view of a detail of Figure 2, shown along lines 3—3 of Figure 2.

In Figure 1 and Figure 2 the electrodes 2 and 3 are rods of, for instance, 3/16" Nichrome wire which support between their tips the heater coil 4, and which at their free tips form the pins to which a standard extension cord plus 18 can be connected. The rods 2, 3 are moulded into a nylon mass 7 where they are anchored by unround sections 8, 9. The nylon moulding engages the knob of a glass lid 1 by contacting it with its nylon bottom wall 7" and a skirt 7' which is spun into the undercut of the glass knob. As shown in detail in Figure 3, the nylon bottom wall 7" has a cavity 10 in which a neon lamp 11 and a resistor 12 are held, wired to the electrodes 2, 3. The nylon wall 7' has two downward nylon extensions 28, 29, which cover the electrodes 2, 3 where they pass through the perforations in the glass lid.

The upper end of the nylon moulding 7 is shaped like a cup. The rim of the cup provides a cool touching point for the left hand when disengaging the electric cord plug 18 with the right hand. Near the bottom of the nylon cup the side walls have holes 20, 21. These holes, in connection with combining means 22, 23, serve to fixate the position of the lid 1 with reference to the body 13 of the kettle. The position which shall be fixated is the one in which the two ears 16, 17 are 90° away from the spout 15, locking the lid into the top opening of the kettle. The rim of the nylon cup extends slightly beyond the pins, 2, 3 so that in upside down position the lid may rest on the rim of the nylon cup. Part of the circumference of the lid 1 is ground away to form a recess 19 which cooperates with the pouring spout 15 to facilitate filling the kettle from the water faucet without removing the lid.

In the example shown, the binding means are a nylon strand 22, which is tied under the handle 14 of the tea kettle, and sealed by a seal 23. With this sealed binding means, it is not possible to turn the lid sufficiently to unlock the ears 16, 17. This means that the owner of the tea kettle cannot lift out the heating element which is joined to the lid. On the other hand, the kettle may be returned to the factory for replacing the heating coil in an easy manner. Owners who are familiar with electrical equipment may, of course, also break the seal themselves to have access for repair. The seal is basically meant as a protection in a household with children.

A repair will be primarily required when the coil has fused, for instance, if a housewife has forgotten about the kettle and has let all the water evaporate. In that case the neon lamp 11, which is wired parallel to the coil, will still glow as a pilot warning light to tell the housewife that the electrodes 2, 3 are still under current.

Figures 4, 5:
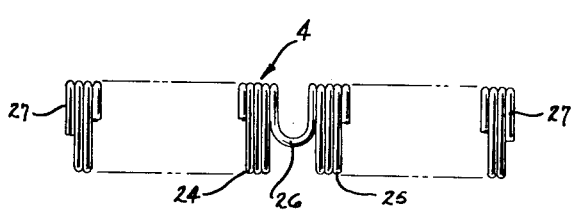
Figure 4 shows a detail of Figure 2, partly in vertical section, partly in view, along the lines 4—4 of Figure 2.
Figure 5 shows a modification of a resistance wire coil, as also shown in Figure 2.

Heating coils of thin resistance wire are easily damaged and if the consumer is supposed to buy such a coil as a spare part and then to attach such a delicate coil to the electrodes 2, 3, special inventive steps have to be taken which are illustrated in Figures 2, 4 and 5. One inventive step is to fixate the helical coil by threading it at each end into two perforations of the electrodes. To facilitate this operation, the electrodes are in the zone of the coil two parallel rods and in each electrode the two holes have a distance from each other, center to center, which is equal to the diameter of the coil. Figure 4 shows the arrangement in detail. As shown in Figure 2, having threaded the wire through these two holes at each end of the coil provides an excellent, evenly-distanced spread of the coil.

If a conventional helical coil is used, one has to thread at one end first a few surplus windings so that one, when threading in the other side, has leeway for threading at the other end, by applying a sense of rotation which will then unthread those surplus windings.

In order to reduce to a minimum of skill the manual job of threading in a new coil, I invented a new special coil which I might term: turnbuckle-springcoil. The new coil of my invention has one section 24 with a left hand thread, and one section 25 with a right hand thread. The two sections join at the turning point 26. Such a turnbuckle-springcoil makes it possible to thread in both ends by the same axial turning action. At each end there will then be the same surplus winding 27 beyond the contact point.

Aside from facilitating the task of inserting a spare part, this coil allows two new technical effects:

First, the OHM resistance value of the coil may be reduced by turning the coil to the effect of producing more ineffective surplus windings 27 and thus shortening the effective length of wire to be traveled by the electric current.

Second, the spring tension of the coil can be changed. The spring tension can be increased by producing more surplus windings and shortening the length of wire between the contact points. This change of spring tension would even have advantages for spring coils in general and is not limited to electric resistance coils.

I believe that my invention of combining an immersion heater with a lid will make immersion heaters in the household more popular than they are. The lid constitutes a shield to protect the hand against the steam coming from the boiling water. Making the lid of the tea kettle out of Pyrex glass allows to view the heater in operation. Fixating the conductors in such non-conducting material as nylon and glass means additional safety. Providing a wire which becomes a fuse when the device is neglected, and providing a pilot warning light also adds to the safety. To lock the conductors to the lid and to lock the lid to the tea kettle and to seal the locking means, while providing for easy filling of the tea pot without removing the lid, again means safety. Hanging the resistance coil free within the water, without contacting the walls of the water kettle, serves to protect the walls of the kettle against an over-heated coil should the water have evaporated. By a great number of seemingly small inventive steps, a new product is created: the electrically heated Pyrex tea kettle.

Having now described the nature of my invention and given examples of the way in which it may be performed,

I claim as my invention:

1. Electric resistance coil, characterized by a helical coil, which is in turnbuckle fashion partly wound with a left hand thread, and partly with a right hand thread, whereby the coil can be threaded at both free ends into engaging means by the same turning move.

2. Electrodes for supporting a helical coil of resistance wire, characterized by two holes in each electrode, the holes having a distance—center to center—from each other, which is equal to the diameter of the coil, whereby the free ends of the coil may be threaded into said two holes at each end of the coil, without deforming the coil.

References Cited in the file of this patent

UNITED STATES PATENTS

| | | |
|---|---|---|
| 2,027,537 | Kircher | Jan. 14, 1936 |
| 2,350,941 | Stevenson | June 6, 1944 |
| 2,606,986 | Sweger | Aug. 12, 1952 |
| 2,635,162 | Kohring | Apr. 14, 1953 |